US008294596B2

(12) United States Patent
Lavielle et al.

(10) Patent No.: US 8,294,596 B2
(45) Date of Patent: Oct. 23, 2012

(54) RADIO-FREQUENCY COMMUNICATION SYSTEM FOR AIRCRAFT

(75) Inventors: Isabelle Lavielle, Balma (FR); Michel Le Toullec, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 1571 days.

(21) Appl. No.: 11/718,487

(22) PCT Filed: Oct. 24, 2005

(86) PCT No.: PCT/FR2005/002640
§ 371 (c)(1),
(2), (4) Date: May 2, 2007

(87) PCT Pub. No.: WO2006/048525
PCT Pub. Date: May 11, 2006

(65) Prior Publication Data
US 2009/0027232 A1 Jan. 29, 2009

(30) Foreign Application Priority Data
Nov. 2, 2004 (FR) ...................................... 04 11635

(51) Int. Cl.
*G01C 21/00* (2006.01)
(52) U.S. Cl. ........ 340/971; 340/981; 340/985; 340/963; 340/964; 700/17; 700/83
(58) Field of Classification Search .................. 340/945, 340/971, 981, 985, 963, 964; 455/431, 67.1, 455/67.7; 700/14, 17–18, 83–85
See application file for complete search history.

(56) References Cited

U.S. PATENT DOCUMENTS

| 4,371,978 A | * | 2/1983 | Lukso | 455/77 |
| 4,419,766 A | * | 12/1983 | Goeken et al. | 455/62 |
| 4,903,298 A | * | 2/1990 | Cline | 380/270 |
| 5,123,112 A | * | 6/1992 | Choate | 455/524 |
| 5,396,651 A | * | 3/1995 | Nitardy | 455/517 |

(Continued)

FOREIGN PATENT DOCUMENTS
EP 1249814 10/2002

OTHER PUBLICATIONS

"Next Generation Air/Ground Communications (NEXCOM) Principles of Operations VDL Mode 3," RTCA/DO-279, RTCA, Inc., 74 pages total, Mar. 5, 2002.

(Continued)

*Primary Examiner* — Daniel Wu
*Assistant Examiner* — Son M Tang
(74) *Attorney, Agent, or Firm* — Dickinson Wright PLLC

(57) ABSTRACT

Disclosed is to an aircraft radiofrequency communication system. The system includes at least one at least one radiofrequency transceiver device that is configured to transmit and receive data according to a VDL mode 3 standard and to receive status information that relates to at least one radio link of the radiofrequency transceiver device and includes the status concerning the possibility of transmitting on a particular, selected frequency. In one embodiment, a man/machine interface unit is configured to display configuration information and at least a portion of the status information. In an alternative embodiment, at least one radiofrequency transceiver device is configured to further determine status information that represents a possibility of using the radiofrequency transceiver device in transmission.

12 Claims, 1 Drawing Sheet

U.S. PATENT DOCUMENTS

| | | | | |
|---|---|---|---|---|
| 5,426,666 A * | 6/1995 | Kato | | 375/141 |
| 5,627,546 A * | 5/1997 | Crow | | 342/352 |
| 5,765,112 A * | 6/1998 | Fitzgerald et al. | | 455/509 |
| 5,786,773 A * | 7/1998 | Murphy | | 340/947 |
| 5,872,526 A * | 2/1999 | Tognazzini | | 340/961 |
| 6,049,548 A * | 4/2000 | Bruno et al. | | 370/445 |
| 6,157,864 A * | 12/2000 | Schwenke et al. | | 700/79 |
| 6,308,052 B1 * | 10/2001 | Jamali et al. | | 455/78 |
| 6,353,779 B1 * | 3/2002 | Simon et al. | | 701/3 |
| 6,356,209 B1 * | 3/2002 | Mitchell et al. | | 340/945 |
| 6,473,675 B2 * | 10/2002 | Sample | | 701/3 |
| 6,477,163 B1 * | 11/2002 | Miller | | 370/347 |
| 6,650,897 B2 * | 11/2003 | Nelson | | 455/431 |
| 6,836,659 B2 | 12/2004 | Gouillou | | |
| 6,915,127 B2 * | 7/2005 | Sakuma | | 455/423 |
| 6,931,248 B2 * | 8/2005 | Borel | | 455/431 |
| 6,943,700 B2 * | 9/2005 | Ceccom et al. | | 340/981 |
| 6,970,704 B2 * | 11/2005 | Jensen et al. | | 455/431 |
| 7,013,243 B2 * | 3/2006 | Koizumi et al. | | 702/189 |
| 7,245,909 B2 * | 7/2007 | Goldberg et al. | | 455/431 |
| 7,313,143 B1 * | 12/2007 | Bruno | | 370/395.4 |
| 7,363,119 B2 * | 4/2008 | Griffin et al. | | 701/3 |
| 7,398,069 B2 * | 7/2008 | Sample et al. | | 455/158.1 |
| 7,418,261 B2 * | 8/2008 | Forbes et al. | | 455/431 |
| 2002/0009994 A1 * | 1/2002 | Sample | | 455/431 |
| 2002/0065586 A1 * | 5/2002 | Sample | | 701/3 |
| 2003/0093798 A1 * | 5/2003 | Rogerson | | 725/75 |
| 2009/0318138 A1 * | 12/2009 | Zeng et al. | | 455/431 |

OTHER PUBLICATIONS

"Team Characteristics 750X VHF Digital Radio," version 2.8.4 dft, draft, FAA 750X Team, 255 pages total, May 2, 2003.

International Search Report dated Jan. 19, 2006 with English translation.

Stephen Pope, "FAA Moves Ahead on VDL-3," Aviation International News, Asian Aerospace 2002, XP002332396, 1 page total, Feb. 28, 2002.

"Technical Summary of RTA-44D VHF Data Radio (VDR)," Honeywell Aerospace Electronic Systems, XP002332397, pp. 1-12, Jun. 2004.

* cited by examiner

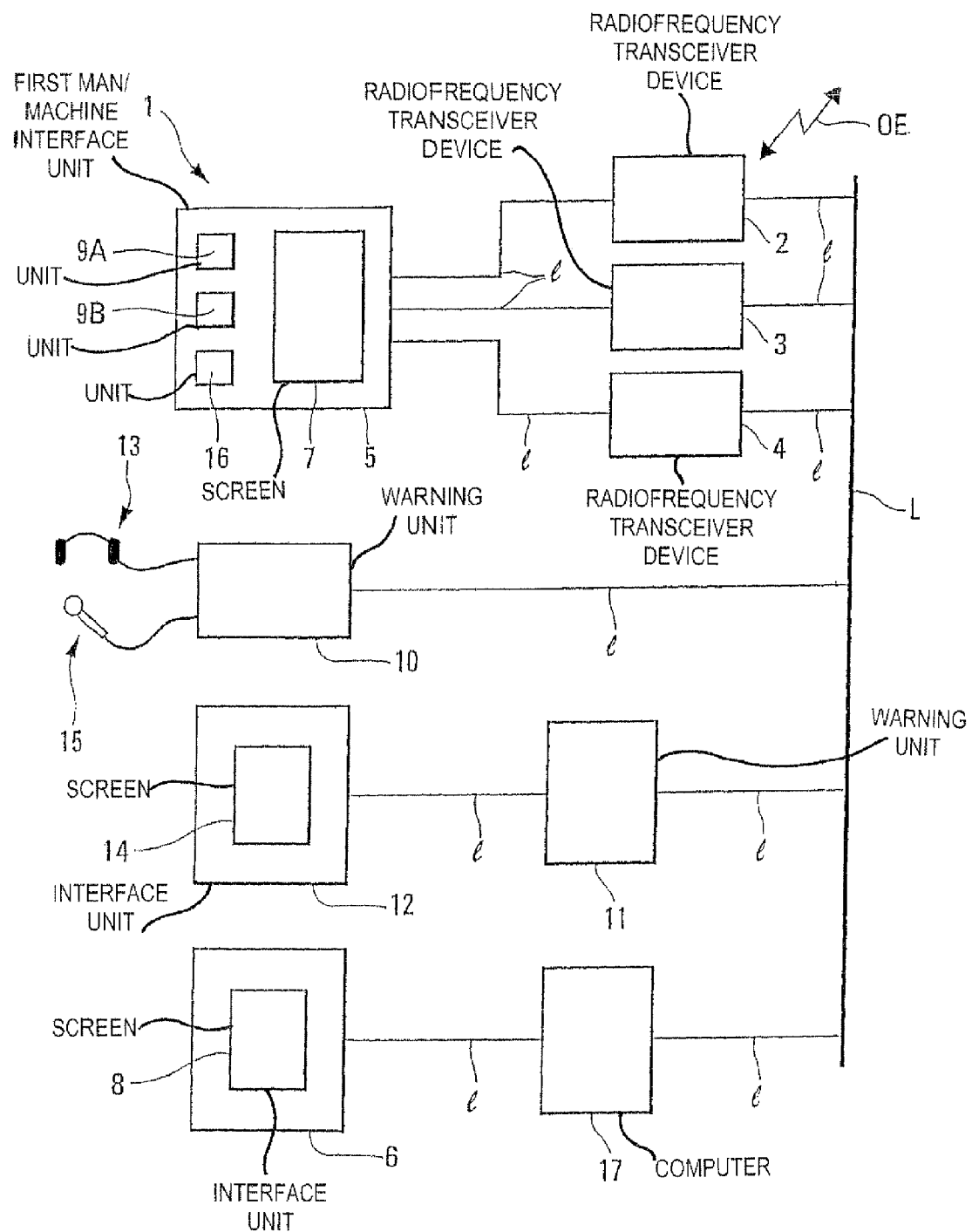

RADIO-FREQUENCY COMMUNICATION SYSTEM FOR AIRCRAFT

FIELD OF THE INVENTION

The present invention relates to a radiofrequency communication system for an aircraft, in particular for a transport aircraft.

BACKGROUND OF THE INVENTION

This radiofrequency communication system comprises at least one radiofrequency transceiver device able to transmit and receive data according to a VDL mode 3 standard.

It is known that a communication mode according to a VDL ("VHF Digital Video Link", that is to say a Very High Frequency digital link) mode 3 standard is a digital air/ground communication mode which makes it possible to reduce the saturation of the very high frequency (VHF) band by means of using additional channels (one VHF frequency supporting four channels) dedicated to one or more groups of users for sound and/or data transmission, according to predefined configurations managed by a system located on the ground.

The VDL mode 3 standard also offers functions making it possible to reduce problems related to analog communications, in particular the case of simultaneous transmissions, push-to-speak button locked in transmission, or channel acquisition errors.

Such a VDL mode 3 standard is described in particular in the following publications:
"NEXCOM Principles of operations VDL mode 3", RTCA/DO-279, Mar. 5, 2002; and
"TEAM Characteristics 750X v2-8-4", VHF Digital Radio, May 2, 2003.

SUMMARY OF THE INVENTION

The present invention relates to a radiofrequency communication system for an aircraft, making it possible to use such an air/ground communication mode (according to the VDL mode 3 standard) and to implement it on man/machine interface means of the aircraft.

For this purpose, according to the invention, said radiofrequency communication system, of the type comprising:
at least one radiofrequency transceiver device, able to transmit and to receive data according to a VDL mode 3 standard, and to receive status information for a radiofrequency communication of said radiofrequency device; and
a first man/machine interface means displaying at least some configuration information of said radiofrequency transceiver device,
is noteworthy in that said first man/machine interface means also displays at least some of said status information for the radiofrequency communication of said radiofrequency transceiver device.

Thus, due to the invention, said radiofrequency communication system is able to present to an operator of the aircraft, and to the pilot in particular, at least some status information for the radiofrequency communication of said radiofrequency transceiver device, in addition to some configuration information.

In the context of the present invention:
status information refers to information relating to the status of the radio link of the radiofrequency transceiver device in question (for example: possibility of transmitting on the selected frequency, impossibility of using certain functions of the link defined by the VDL mode 3 standard, etc); and
configuration information refers of information relating to the communication capability of the radiofrequency transceiver device in question (in particular: sound only; data transmission only; sound and data transmission).

In a particular embodiment, said radiofrequency communication system comprises:
a plurality of radiofrequency transceiver devices, able to transmit and to receive data according to the VDL mode 3 standard, as well as to receive status information for the radiofrequency communications of said radiofrequency transceiver devices; and
a second man/machine interface means able to display, at the request of an operator, a synthesis of status information relating to the plurality of said radiofrequency devices.

In this case, advantageously, said first and second man/machine interface means are integrated in one and the same interface unit. Preferably, this interface unit is a frequency adjustment device, such as an RMP (Radio Management Panel).

In another embodiment, said second man/machine interface means is an MCDU (Multipurpose Control and Display Unit).

Moreover, advantageously:
at least one radiofrequency transceiver device is able to receive information representing a frequency given by air control for the communication of said radiofrequency transceiver device;
said first man/machine interface means displays, if necessary, said information representing said frequency given by air control; and
said first man/machine interface means comprises means of selecting and activating said frequency on said radiofrequency transceiver device.

Advantageously, said first man/machine interface means furthermore comprises at least one indicator able to indicate, if necessary, that said frequency has been given by data link. This indicator allows the pilot to know if the displayed frequency (which he can activate) has been acquired manually (indicator off for example) or if it has been received by data link (indicator on for example).

Moreover, said radiofrequency communication system according to the invention advantageously comprises:
at least one radiofrequency transceiver device which is able to determine status information representing the possibility of using that radiofrequency transceiver device in transmission; and
warning means for warning an operator of the aircraft when he attempts to use said radiofrequency transceiver device in transmission whilst said status information corresponds to an impossibility of using that radiofrequency transceiver device in transmission, for example because of a transmission in progress by another transceiver device or the preemption of the corresponding channel by air control.

In this case, the radiofrequency communication system advantageously comprises a third man/machine interface means and said warning means are able to activate a sound signal, for example in a headset of a pilot of the aircraft, and to activate the display, on said third man/machine interface means, said status information corresponding to an impossibility of using said radiofrequency transceiver device in transmission.

Said warning means preferably simultaneously activate, if necessary, said sound signal and the display of said status information, which facilitates the warning/action association by the pilot (release of the push-to-speak button).

In a preferred embodiment, said third interface means is an ECAM (Electronic Centralized Aircraft Monitoring) device.

Moreover, in a particular embodiment, said first man/machine interface means comprises a means, for example a key, allowing an operator to request the possibility of using a radiofrequency transceiver device in transmission. This, in particular, allows the operator to warn air control (by data link) of an urgent need to transmit (in sound mode), when the radiofrequency transceiver device is locked in receive-only mode (in sound mode).

Moreover, said radiofrequency communication system furthermore comprises an indicator which is associated with the display of the active frequency and which is able to indicate that the request by an operator such as mentioned above (to use a radiofrequency transceiver device in transmission) has been received by air control.

BRIEF DESCRIPTION OF THE DRAWINGS

The single FIGURE of the appended drawing will give a good understanding of how the invention can be embodied. This FIGURE is a block diagram of a radiofrequency communication system according to the invention.

DETAILED DESCRIPTION OF THE INVENTION

The radiofrequency communication system 1 according to the invention and shown diagrammatically in FIG. 1 is installed in an aircraft, which is not shown, in particular on a transport aircraft, and is intended for radiofrequency communication between this system 1 and the exterior, in particular an air control station on the ground, as illustrated by an electromagnetic wave OE.

In order to do this, said communication system 1 comprises:
- at least one radiofrequency transceiver device 2, 3, 4 (such as an on-board radio), able to transmit and to receive data (in the form of electromagnetic waves OE) according to the VDL mode 3 standard of the type mentioned above, described in particular in the documents mentioned above, and to receive status information for a radiofrequency communication of said transceiver device 2, 3, 4. "Status information" means information relating to the status of the radio link of the radiofrequency transceiver device 2, 3, 4 in question (for example: possibility of transmitting on the selected frequency, etc); and
- a first man/machine interface means 5 connected to said transceiver device 2, 3, 4 and displaying at least some configuration information of said transceiver device 2, 3, 4. "Configuration information" means information relating to the communication capability of the radiofrequency transceiver device 2, 3, 4 in question (in particular: sound only; data transmission only, sound and data transmission).

The radiofrequency transceiver device 2, 3, 4 can be an on-board radio of the VDR ("VHF Data Radio, that is to say a radiofrequency data radio) type.

According to the invention, said first man/machine interface means 5 also displays, for example on a screen 7, at least some of said status information for the radiofrequency communication of said transceiver device 2, 3, 4.

Thus, due to the invention, said radiofrequency communication system 1 is able to present to an operator, in particular to the pilot of the aircraft, at least some status information for the radiofrequency communication of said transceiver device 2, 3, 4, in addition to the configuration information.

In a particular embodiment, said first man/machine interface means 5 is a frequency adjustment device, such as an RMP (Radio Management Panel).

In a particular embodiment shown in the FIGURE, said radiofrequency communication system 1 comprises:
- a plurality of radiofrequency transceiver devices 2, 3, 4 each of which are able to transmit and to receive data according to said VDL mode 3 standard and to receive status information for the radiofrequency communications of said transceiver devices 2, 3, 4; and
- a second man/machine interface means 6 able to display, for example on a screen 8, at the request of an operator, a synthesis of status information relating to the plurality of said transceiver devices 2, 3, 4.

This embodiment makes it possible, in particular, to inform the pilot of the aircraft in order that he may know at all times the transceiver device or devices 2, 3, 4 which are available.

In this case, said second man/machine interface means 6 can be an MCDU (Multipurpose Control and Display Unit).

In another embodiment, which is not shown, said first and second man/machine interface means 5 and 6 are integrated in one and the same interface unit. Said interface unit is preferably a frequency adjustment device, such as an RMP (Radio Management Panel).

Moreover, in a particular embodiment:
- at least one radiofrequency transceiver device 2, 3, 4 is able to receive information representing a frequency sent by air control for the communication of said radiofrequency transceiver device 2, 3, 4;
- said first man/machine interface means 5 displays, for example on the screen 7, if necessary, said information representing said frequency sent by air control; and
- said first man/machine interface means 5 furthermore comprises means 9A for selecting and means 9B for activating said frequency on said radiofrequency transceiver device 2, 3, 4.

Thus the radiofrequency communication system 1 can warn the pilot that the next channel (or frequency) has been transmitted automatically from the ground (by data link) and that a manual acquisition is not necessary, and invite him to select and activate that frequency, by the intermediary of the means 9A and 9B.

Moreover, said first man/machine interface means 5 comprises at least one indicator (not shown) able to indicate if necessary that said frequency has been sent by data link. That indicator allows the pilot to know if the displayed frequency (which he can activate) has been acquired manually (indicator off) or has been received by data link (indicator on). Preferably, said first man/machine interface means 5 comprises at least two display devices (or two display zones of a same display device, for example the screen 7), one of them able to display a frequency being prepared (for example received by data link) and the other one able to display the frequency active on the transceiver device 2, 3, 4 in question. The indicator is associated with the display of the frequency being prepared and received by data link. Preferably, when it is active, that indicator is flashing. Also preferably, the display of the received frequency flashes for a few seconds in order to indicate that this frequency value has been received by data link (and therefore has not been acquired manually). As long as this display is flashing, it is not possible to change the value of the received frequency. Said display then becomes fixed and it is then possible to change said received frequency value. The indicator is deactivated either at the time of a change of said value of the received frequency, or when activating this frequency (which is then displayed on the display device or the display zone corresponding to the active frequency).

In another embodiment:
at least one radiofrequency transceiver device 2, 3, 4 is able to determine status information representing the possibility of using that radiofrequency transceiver device 2, 3, 4 in transmission; and
said radiofrequency communication system 1 furthermore comprises warning means 10, 11, as defined above, for warning an operator of the aircraft when he attempts to use said radiofrequency transceiver device 2, 3, 4 in transmission by actuating the press-to-speak button, whilst the state of said status information corresponds to an impossibility of transmission using said radiofrequency transceiver device 2, 3, 4 (which is in receive-only mode), for example because of a transmission in progress by another transceiver device or the preemption of the channel by air control.

In this case, said radiofrequency communication system 1 furthermore comprises a third man/machine interface means 12. Moreover, said warning means 10 are able to activate a sound signal, for example in a headset 13 of a pilot of the aircraft or in a loud speaker in the piloting position, and to activate the display, on a screen 14 of said third man/machine interface means 12, said status information corresponding to an impossibility of transmitting using said radiofrequency transceiver device 2, 3, 4.

The sound warning and the display disappear when the pilot releases a push-to-speak button (situated for example on the piloting control column or on the first interface means 5) and reappear when the pilot again actuates this push-to-speak button with a transceiver device 2, 3, 4 still in receive-only mode.

The sound of the sound warning corresponds to the international standard for an engaged telephone tone (in order to be understood by pilots of all origins) and is composed of two frequencies (in order to compensate for a hearing deficiency at a particular frequency).

Preferably, said warning means 10 and 11 simultaneously activate said sound signal and the display of said status information, which facilitates the warning/action association by the pilot (release of the push-to-speak button).

In a preferred embodiment:
said third interface means 12 is an ECAM (Electronic Centralized Aircraft Monitoring) device;
said warning means 10 comprise an AMU (Audio Management Unit) managing the audio functioning of the headset 13 and of a microphone 15; and
said warning means 11 comprise an FWC (Flight Warning Computer) or an FWS (Flight Warning System) which is associated with said third interface means 12.

Moreover, in a particular embodiment, said first man/machine interface means 5 comprises a means 16 such as a key for example, allowing an operator the possibility of requesting transmission using a radiofrequency transceiver device 2, 3, 4. In particular, this allows the operator to warn air control (by data link) of an urgent need to transmit (using sound), in particular when the radiofrequency transceiver device 2, 3, 4 he is using is locked in receive-only mode (in sound mode).

Said communication system 1 furthermore comprises an indicator (not shown) which is associated with the display of the active frequency and which is able to indicate that the request from an operator (pilot) such as mentioned above has been received (and acknowledged) by air control. In order to do this, the transceiver device 2, 3, 4 receives status information from air control indicating that said request has been received by air control. This indicator can be an indicator lamp. Preferably, when the pilot presses the means 16 (key) in order to make a transmission request, this indicator is activated such that it flashes and then the illumination becomes continuous after reception of the status information indicating the reception of the request by air control. The indicator is deactivated either by the pilot pushing the means 16 again (canceling the transmission request) or by a transmission on the frequency in question (the request has succeeded).

In a particular embodiment, shown in the FIGURE:
the communication system 1 furthermore comprises a computer 17, of the ATSU (Air Traffic Services Unit) type, dedicated to air traffic, which is connected to said second man/machine interface means 6; and
the various abovementioned elements of the communication system 1 are connected together by the intermediary of a principal bus L and secondary links 1.

The invention claimed is:

1. A radiofrequency communication system for aircraft, comprising:
a plurality of radiofrequency transceiver devices configured to transmit and to receive data according to a VHF Digital Video Link mode 3 standard, as well as to receive status information for radiofrequency communications of said radiofrequency transceiver devices, wherein the status information refers to status information relating to at least one radio link of at least one of the plurality of radiofrequency transceiver devices, with the status information including at least the status of a possibility of transmitting on a selected frequency;
a first man/machine interface unit configured to display at least some configuration information relating to communication capability of said radiofrequency transceiver devices and to display at least some of said status information for the radiofrequency communication of said radiofrequency transceiver devices, wherein configuration information refers to sound only information, data transmission only information and sound and data transmission information; and
a second man/machine interface unit configured to display, at the request of an operator, a synthesis of status information relating to the plurality of said radiofrequency devices.

2. The system as claimed in claim 1, wherein said first and second man/machine interface units are integrated into one interface unit.

3. The system as claimed in claim 2, wherein said interface unit is a frequency adjustment device, of the radio management panel type.

4. The system as claimed in claim 1, wherein said second man/machine interface unit is a multipurpose control and display unit.

5. The system as claimed in claim 1, wherein said first man/machine interface unit comprises request device configured to enable an operator to request the possibility of using the at least one radiofrequency transceiver device in transmission.

6. The system as claimed in claim 5, wherein said request device is a key of said first man/machine interface unit.

7. The system as claimed in claim 5, further comprising an indicator which is associated with the display of the active frequency and which is configured to indicate that the request by the operator to use the at least one radiofrequency transceiver device in transmission has been received by air control.

8. An aircraft, comprising a radiofrequency communication system, wherein the radiofrequency communication system is comprised of:
  a plurality of radiofrequency transceiver devices configured to transmit and to receive data according to a VHF Digital Video Link mode 3 standard, as well as to receive status information for radiofrequency communications of said radiofrequency transceiver devices, wherein the status information refers to status information relating to at least one radio link of at least one of the plurality of radiofrequency transceiver devices, with the status information including at least the status of a possibility of transmitting on a selected frequency;
  a first man/machine interface unit configured to display at least some configuration information relating to communication capability of said radiofrequency transceiver devices and to display at least some of said status information for the radiofrequency communication of said radiofrequency transceiver devices, wherein configuration information refers to sound only information, data transmission only information and sound and data transmission information; and
  a second man/machine interface unit configured to display, at the request of an operator, a synthesis of status information relating to the plurality of said radiofrequency devices.

9. A radiofrequency communication system for aircraft, comprising:
  at least one radiofrequency transceiver device configured to transmit and receive data according to a VHF Digital Video Link mode 3 standard and to receive status information representing a frequency transmitted by air control for communicating with said radiofrequency transceiver device, wherein the status information refers to status information relating to at least one radio link of the radiofrequency transceiver device, with the status information including at least the status of a possibility of transmitting on a selected frequency; and
  a first man/machine interface unit configured to display at least some configuration information relating to communication capability of said radiofrequency transceiver device and to display at least some of said status information for the radiofrequency communication of said radiofrequency transceiver device, wherein configuration information refers to sound only information, data transmission only information and sound and data transmission information, wherein:
  said first man/machine interface unit is configured to display said at least some configuration information representing said frequency transmitted by air control; and
  said first man/machine interface unit comprises frequency selector and frequency activator configured to select and activate said frequency on said radiofrequency transceiver device.

10. The system as claimed in claim 9, wherein said first man/machine interface unit further comprises at least one indicator configured to indicate, if necessary, that said frequency has been provided by data link.

11. A radiofrequency communication system for aircraft, comprising:
  at least one radiofrequency transceiver device configured to transmit and receive data according to a VHF Digital Video Link mode 3 standard and to receive status information for a radiofrequency communication of said radiofrequency transceiver device, wherein the status information refers to status information relating to at least one radio link of the radiofrequency transceiver device, with the status information including at least the status of a possibility of transmitting on a selected frequency;
  at least one radiofrequency transceiver device configured to determine the status information, wherein the status information further represents a possibility of using the radiofrequency transceiver device in transmission;
  at least one warning unit configured to warn an operator of the aircraft when said status information corresponds to a determination of an impossibility of using the radiofrequency transceiver device in transmission; and
  a third man/machine interface unit,
  wherein:
  said at least one warning unit is configured to activate a sound signal and activate a display on said third man/machine interface unit when said status information corresponds to a determination of an impossibility of using the radiofrequency transceiver in transmission, and said at least one warning unit is configured to simultaneously activate said sound signal and the display of said status information.

12. The system as claimed in claim 11, wherein said third interface unit is an electronic centralized aircraft monitoring device.

* * * * *